US011139992B1

(12) United States Patent
Biggers et al.

(10) Patent No.: US 11,139,992 B1
(45) Date of Patent: Oct. 5, 2021

(54) SYSTEMS AND METHODS FOR REMOTELY POWERED DATA CONCENTRATORS FOR DISTRIBUTED IMA SYSTEM

(71) Applicant: Rockwell Collins, Inc., Cedar Rapids, IA (US)

(72) Inventors: Christopher Biggers, North Liberty, IA (US); Brent Nelson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 15/798,307

(22) Filed: Oct. 30, 2017

(51) Int. Cl.
| | |
|---|---|
| *G06F 19/00* | (2018.01) |
| *H04L 12/10* | (2006.01) |
| *H04L 12/947* | (2013.01) |
| *H04L 12/40* | (2006.01) |
| *B64D 47/00* | (2006.01) |
| *H04L 29/08* | (2006.01) |
| *H04L 5/14* | (2006.01) |

(52) U.S. Cl.
CPC ............ *H04L 12/10* (2013.01); *B64D 47/00* (2013.01); *H04L 12/40* (2013.01); *H04L 49/25* (2013.01); *B64D 2221/00* (2013.01); *H04L 5/14* (2013.01); *H04L 67/12* (2013.01); *H04L 2012/4028* (2013.01)

(58) Field of Classification Search
CPC .......... H04L 12/10; H04L 12/40; H04L 49/25
See application file for complete search history.

(56) References Cited

U.S. PATENT DOCUMENTS

| | | | | |
|---|---|---|---|---|
| 6,092,008 | A * | 7/2000 | Bateman ............... | G07C 5/008 244/1 R |
| 7,136,725 | B1 * | 11/2006 | Paciorek ................ | H02J 3/14 700/295 |
| 8,537,727 | B2 * | 9/2013 | Guillot .................... | H04B 3/54 340/538 |
| 8,818,739 | B2 * | 8/2014 | Zakrzewski ............ | G07C 5/08 702/42 |
| 9,160,252 | B1 * | 10/2015 | Pullen ................ | H02M 7/53871 |
| 9,273,981 | B1 * | 3/2016 | Downey ............... | B64C 39/024 |
| 9,387,935 | B2 * | 7/2016 | Todd ........................ | H02J 9/061 |
| 9,659,192 | B1 * | 5/2017 | Wanasek ................ | G06F 21/81 |
| 9,678,488 | B1 * | 6/2017 | Dhondt ............. | G05B 23/0256 |
| 10,182,065 | B1 * | 1/2019 | Ryon ................... | H04L 63/1425 |
| 10,362,035 | B1 * | 7/2019 | Corbett .................. | H04L 63/10 |

(Continued)

*Primary Examiner* — Parth Patel

(74) *Attorney, Agent, or Firm* — Suiter Swantz pc llo

(57) ABSTRACT

A system includes an avionics power bus network, switch, and data concentrator. The avionics power bus network provides power to at least a first endpoint system and second endpoint system coupled via at least one network pathway configured for transmitting a data packet between the first and second endpoint and is operably connected to the switch. The switch is configured to receive a data packet from the first endpoint and transmit the data packet along the network pathway to the second endpoint and is configured to receive power from the avionics power bus network. The data concentrator is operably connected the first endpoint to receive the data packet from the first endpoint and is operably connected to the switch through a wire. The wire is configured to transmit power from the switch to the data concentrator and to transmit the data packet from the data concentrator to the switch.

20 Claims, 5 Drawing Sheets

(56) References Cited

U.S. PATENT DOCUMENTS

| | | | |
|---|---|---|---|
| 2003/0047997 A1* | 3/2003 | Bernier | B64D 41/00 307/9.1 |
| 2003/0208764 A1* | 11/2003 | Galipeau | H04N 7/173 725/76 |
| 2005/0121978 A1* | 6/2005 | McAvoy | H02J 3/14 307/43 |
| 2006/0062143 A1* | 3/2006 | Bibby | G05D 1/0077 370/225 |
| 2008/0119968 A1* | 5/2008 | Loda | H04L 67/025 701/3 |
| 2008/0217471 A1* | 9/2008 | Liu | G05B 23/0213 244/1 R |
| 2008/0303353 A1* | 12/2008 | Yu | H02J 13/0003 307/131 |
| 2009/0112381 A1* | 4/2009 | Schwinn | B64D 45/00 701/14 |
| 2009/0167076 A1* | 7/2009 | Serventi | H02J 4/00 307/9.1 |
| 2009/0278401 A1* | 11/2009 | Summers | B60T 13/741 303/20 |
| 2010/0036540 A1* | 2/2010 | Vian | H02J 3/14 700/297 |
| 2011/0103268 A1* | 5/2011 | Mann | H04L 12/40169 370/276 |
| 2011/0200336 A1* | 8/2011 | Andreu | G02B 6/4292 398/135 |
| 2012/0026013 A1* | 2/2012 | Fuller | G08G 1/042 340/928 |
| 2012/0095703 A1* | 4/2012 | Zakrzewski | B64C 25/00 702/42 |
| 2013/0003620 A1* | 1/2013 | Dame | H01Q 1/007 370/310 |
| 2013/0138271 A1* | 5/2013 | Danielsson | H04L 67/322 701/3 |
| 2013/0149894 A1* | 6/2013 | Woydack | H04L 12/10 439/527 |
| 2013/0159477 A1* | 6/2013 | Danielsson | G06F 9/5066 709/220 |
| 2013/0169036 A1* | 7/2013 | Todd | H02J 4/00 307/9.1 |
| 2013/0253735 A1* | 9/2013 | Roy | B64D 31/00 701/3 |
| 2013/0305391 A1* | 11/2013 | Haukom | G06F 21/84 726/29 |
| 2013/0318214 A1* | 11/2013 | Tebay | H04L 67/06 709/219 |
| 2014/0297155 A1* | 10/2014 | Chen | F02C 9/28 701/100 |
| 2014/0370928 A1* | 12/2014 | Ge | H04W 52/04 455/522 |
| 2015/0045978 A1* | 2/2015 | Yoshiguchi | H02J 3/14 700/295 |
| 2015/0225089 A1* | 8/2015 | Judge | B64D 43/00 701/3 |
| 2016/0270052 A1* | 9/2016 | Dame | H04W 4/70 |
| 2016/0306417 A1* | 10/2016 | Greig | H02J 1/14 |
| 2017/0048073 A1* | 2/2017 | Klose | H04L 12/10 |
| 2017/0063151 A1* | 3/2017 | Freitag | H02J 3/14 |
| 2017/0070357 A1* | 3/2017 | Kanayama | H04L 12/189 |
| 2018/0319508 A1* | 11/2018 | Chodavarapu | B64D 31/14 |
| 2019/0041851 A1* | 2/2019 | Ortiz | G05D 1/0077 |
| 2019/0126894 A1* | 5/2019 | Goyez | B60T 8/1703 |

\* cited by examiner

SYSTEMS AND METHODS FOR REMOTELY POWERED DATA CONCENTRATORS FOR DISTRIBUTED IMA SYSTEM

BACKGROUND

The inventive concepts disclosed herein relate generally to the field of avionics systems. More particularly, embodiments of the inventive concepts disclosed herein relate to systems and methods for modified network routing based on modal information.

Aircrafts typically include a great number of sensors, effectors (e.g. actuators), and other components connected to an avionics system having one or more central processors. These various avionics systems generally include numerous components that may exchange data among one or more other components. In avionics systems, redundant networks are common design considerations. As aircraft electronics become increasingly connected, many avionics systems are using network communications, particularly Ethernet-based networks, for high speed communications between a large variety of devices. Network connections can use configurable routing of data through the networks (e.g., ARINC 664 networks) to establish installations and options for how the data moves from source devices to destination devices. For example, an Ethernet network may be used to send or route data in a digital form by packets. Each packet contains a set of data, and the packet is generally not interpreted while sent through the Ethernet network. In an avionics system environment, the Ethernet network typically has different components that subscribe to the avionics system and connect to each other through switches.

Current Integrated Modular Avionics ("IMA") architectures are reliant on data concentrators to bring the aircraft system inputs and outputs ("I/O") into the IMA system. IMA systems include a plurality of processing modules all tied together by a common Avionics Full-Duplex Switched Ethernet ("AFDX"), ARINC 664 standard network. Conventional communications systems typically involve the use of equipment, such as physical cables or wiring, that add weight to an aircraft, or occupy space in the aircraft, or both. However, in existing systems, placement of data concentrators is limited by the availability of connections to the aircraft power bus network. It may be undesirable to place the connections to the aircraft power bus network in the very locations where sensors are desired—such as in proximity to engines. As such, existing systems may require fewer, larger data concentrators to be placed further from the sensors from which data is being concentrated, increasing the complexity of the data network and the weight of cabling used to form the data network.

SUMMARY

In one aspect, the inventive concepts disclosed herein are directed to a system. The system includes an avionics power bus network, a switch, and a data concentrator. The avionics power bus network provides power to at least a first endpoint system and a second endpoint system coupled via at least one network pathway. The network pathway is configured for transmitting a data packet between the first endpoint and the second endpoint. The switch is operably connected to the avionics power bus network. The switch is configured to receive a data packet from the first endpoint and transmit the data packet along the network pathway to the second endpoint. The switch is configured to receive power from the avionics power bus network. The data concentrator is operably connected the first endpoint to receive the data packet from the first endpoint. The data concentrator is operably connected to the switch through a wire. The wire is configured to transmit power from the switch to the data concentrator and configured to transmit the data packet from the data concentrator to the switch.

In a further aspect, the inventive concepts disclosed herein are directed to a method. The method includes receiving, at a switch, power from an avionics power bus network. The provides power to at least a first endpoint system and a second endpoint system. The method includes transmitting, from the switch, the power over a wire to a data concentrator coupled to the first endpoint system. The method further includes receiving, at the switch, a data packet transmitted by the first endpoint system over the wire via the data concentrator. The method includes communicating the data packet from the switch to the second endpoint system using a network pathway. The network pathway providing communications between the first endpoint system and the second endpoint system through one or more of network access interfaces.

In a further aspect, the inventive concepts disclosed herein are directed to data concentrator. The data concentrator a pin, a wire, and a processor. The pin includes a data bus and a power bus. The data bus is configured to transmit a data packet over a network pathway connecting a first endpoint system and a second endpoint system. The power bus is configured to receive direct current power. The wire is operably connected to the pin and is configured transmit direct current to the data concentrator and configured to transmit the data packet from the data concentrator over the network pathway. The processor is to receive the data packet from the first endpoint system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
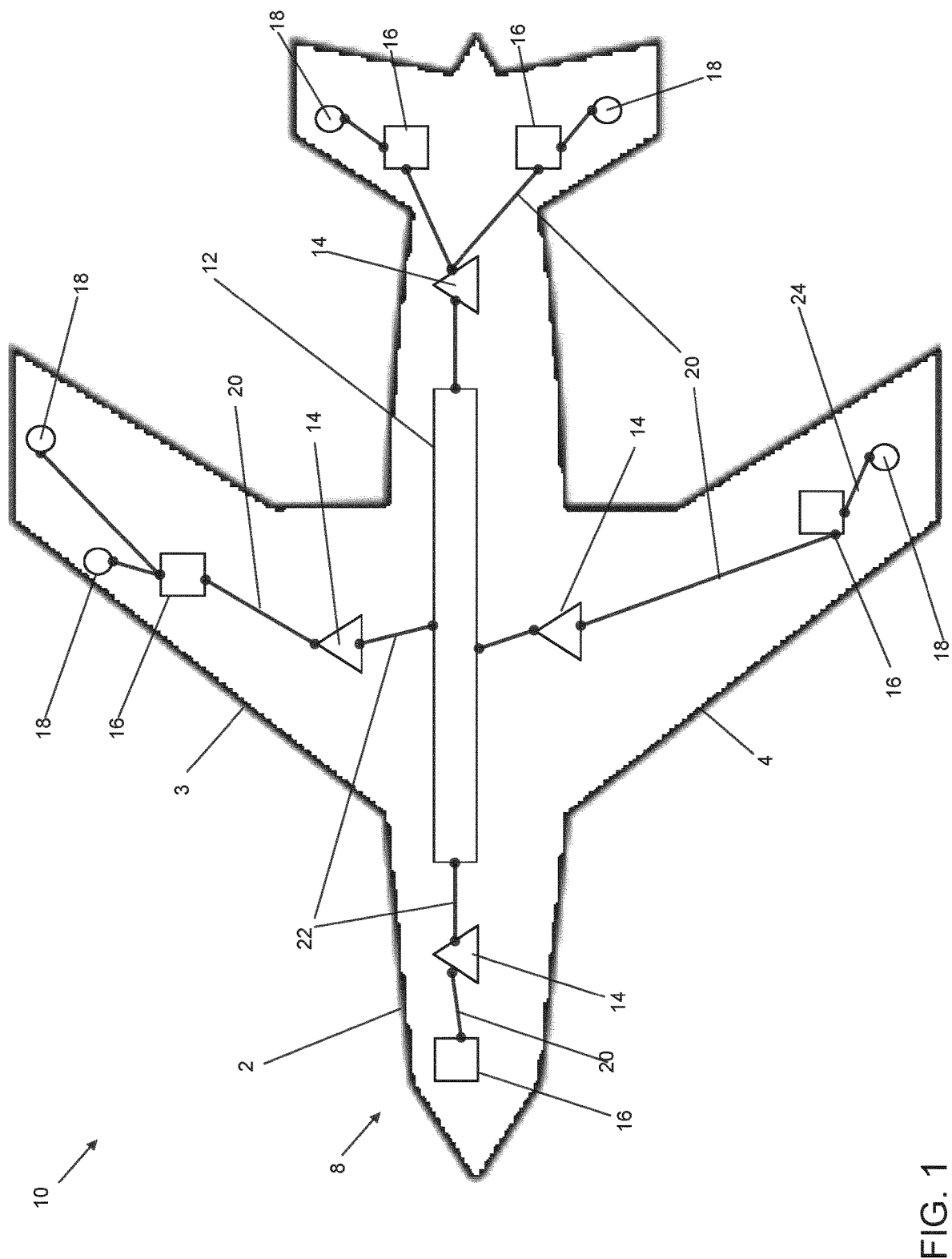
FIG. 1 is a plan view diagram of an exemplary embodiment of an aircraft employing remotely powered data concentrators for a distributed IMA system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system). For example, the power bus network or interconnect of a water vessel or other transport vehicle or craft, or of a building or a geographical area, can similarly be used to provide secure communications between devices or subsystems.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for one or more remote data concentrators ("RDC") distributed throughout an aircraft that are connected for both power and communications protocol (e.g., IEEE 802.3, or ARINC 664) to a "host" (e.g., the switch 14 the RDC is connected to, such as depicted in FIG. 1) switch. The RDC consumes wattage (e.g., power) and connectivity over a single cable that connects the RDC to power and the network pathway from a host switch. The RDCs and switches are implemented into a distributed IMA system. Typically, the RDCs are connected by the IMA backbone bus to facilitate data packets from various aircraft system I/O into the IMA system. For example, RDCs may facilitate data packet routing from various sensors, including sensors used to detect critical aircraft state information, engine operation information, and other component operation information. Beneficially, the IMA system includes fewer, more centralized processing units to streamline data transfer and reduce weight.

In some embodiments, a system includes an avionics power bus network, a switch, and a data concentrator. The avionics power bus network provides power to at least a first endpoint system and a second endpoint system coupled via at least one network pathway. The network pathway is configured for transmitting a data packet between the first endpoint and the second endpoint. The switch is operably connected to the avionics power bus network. The switch is configured to receive a data packet from the first endpoint and transmit the data packet along the network pathway to the second endpoint. The switch is configured to receive power from the avionics power bus network. The data concentrator is operably connected the first endpoint to receive the data packet from the first endpoint. The data concentrator is operably connected to the switch through a wire. The wire is configured to transmit power from the switch to the data concentrator and configured to transmit the data packet from the data concentrator to the switch. Beneficially, the placement of the RDC and sensors is not restricted by the availability of power bus connections. Further, the use of the systems and methods including a single cable connection for both power and network connectivity between the RDC and the host switch provides a reduction in the overall system cable weight and the complexity of the cable system. Similarly, the inventive concepts disclosed herein can improve operation of endpoint systems and RDCs by allowing the RDCs to be placed more closely to the endpoint systems, such as by improving the data concentration executed by the RDCs.

FIG. 1 illustrates a plan view diagram of an aircraft employing remotely powered data concentrators for a distributed IMA system 10 (herein referred to as "avionics system") according to an exemplary embodiment of the inventive concepts disclosed herein. The aircraft 8 includes a fuselage 2, wings 4,6, a main power bus network 12, a plurality of switches 14, a plurality of RDCs 16, and a plurality of sensors 18 (e.g., endpoint systems). Generally, the power bus network 12 is connected to each of the plurality of switches through one or more wired connections 22. Similarly, each of the plurality of RDCs 16 are connected to the plurality of sensors 18 through one or more wired connections 24. Each RDC 16 is connected to a switch in the plurality of switches 14 through a single cable 20 (e.g., quadrax connection cable) that provides both power and network connectivity therethrough. The fuselage 2 includes a nose, a center connected to the wings 4, 6, and a tail. In each of these fuselage segments, a switch 14 and one or more groups of RDCs 16 are disposed. The location and grouping of the RDCs 16 is dependent upon the location of various electronic sensors 18, effectors, or other components having one or more central processors that need to be connected to the avionics system 10.

The aircraft's power bus network 12 is used to provide primary power to different systems on the aircraft 8 including the avionics system 10. Accordingly, the power bus network 12 is connected, either directly or indirectly, to all of the aircraft's systems that consume power. Accordingly, the power bus network 12 is operably connected to each switch in the plurality of switches by wired connections 22 to provide aircraft power directly to each of the plurality of switches 14. In some embodiments, the power bus network 12 provides power to a plurality of devices that form a network pathway 13 that is operably connected to the endpoint and intermediary systems in the avionics system 10 and configured to transmit electronic transmissions (e.g., data packets, Ethernet frames, and other electronic signals) therethrough. In other embodiments, the power bus network 12 can be used as a backbone to establish a communications network throughout the aircraft 8. In those embodiments, the power bus network 12 is operably connected to the avionics system 10 to facilitate transfer of data packets from the endpoint systems (e.g., plurality of sensors 18) and the transmission of commands or communications from the avionics system to the endpoint systems and/or intermediary systems. Accordingly, the wired connection 22 with each switch 14 may include separate wiring for power and network communications. As will be appreciated, in either embodiment, aircraft power is directly supplied to the plurality of switches 14.

Enabling the aircraft power bus network 12 for not directly powering in-aircraft communications introduces an additional or alternate configuration of the avionics system 10. Specifically, by not directly connecting the sensors 18 or RDCs 16 to the power bus domains, potential issues can be mitigated with running aircraft power to certain undesirable locations or less than ideal locations for example, the tail or wheels of the aircraft 8. The term "undesirable location" refers to locations of the aircraft 8 where having direct aircraft power is not preferred, either for safety precautions, instrument implementation reasons, or power efficiency. Beneficially, the avionics system 10 provides power to the RDCs 16 and sensors 18, including those in undesirable locations without having the power be directly provided by the aircraft power. Further, the use of a single cable connection providing both power and network connectivity between the plurality of RDCs 16 and plurality of switches 14 does not introduce significant weight to an aircraft or require significant additional space for communications equipment.

The network pathway 13 (e.g., aircraft electronic communication network) is configured to transmit data packets from one endpoint system or device to another endpoint system or device, through one or more intermediary systems (e.g., switches or RDCs). While the network pathway 13 is not shown in FIG. 1 explicitly, it will be appreciated, that the network pathway 13 runs through the aircraft 8, connecting endpoint systems, through the electronic devices that have wired (e.g., Ethernet) or wireless (e.g., antennas, routers, and repeaters) network components. The transmission of a data packet may occur in the transmission of a signal, such that the signal includes the data packet in some form. An endpoint device or system can include any electrically powered device, system or module connected (indirectly) to the power bus network for power. For example, an aircraft engine, landing gear system, navigational system, or inflight entertainment content server. Another endpoint device, either operated by a person or executing a program, may seek to connect to any one or more of these endpoint systems to obtain status data, perform diagnostics, or perform software updates. For example, primary flight displays configured to display high integrity information to a pilot and/or co-pilot. The data packets may include information—in analog or digital form—related to a strain gauge, synchro I/O, fuel quantity, analog I/O (AC, DC), mV DC measurement, thermocouple, capacitor input, RTD (temperature sensor), RVDT (rotational position sensor), input & tachometer frequency inputs, torque pressure, inlet turbine temperature, fuel flow, engine oil pressure, engine oil temperature, outside air temperature, hydraulic pressure, and the like. The data packet traveling over the network pathway 13 may be static (e.g., predetermined, standard), such as for communicating flight parameter data from flight parameter sensors to the flight management system.

The network pathway 13 may include one or more network interface device, which can receive incoming data packets, or similar electronic communications, from various electronic devices directly or indirectly connected to the network interface device, and route the incoming transmissions to appropriate destination electronic devices based on a network configuration. The network interface device may be located along the network pathway 13, for example, between the switch 14 and the RDC 16. Alternatively, the network interface device may be located inside a component connected to the network pathway 13, for example, in the sensor 14 or the RDC 16. Various other electronic devices may be configured to communicate with the network interface device or connect to the network pathway 13.

Beneficially, the network pathway 13 may include a gateway to access the network pathway 13 and/or access information about the network pathway 13. The network gateway may provide authentication services to validate credentials provided by an endpoint system (e.g., access device) and determine whether to deny or grant access to the network pathway 13. The credentials and information may include any type or form of login information, certificate, encryption key information, biometrics, password/passcode, captcha response, addresses (e.g., device IP addresses associated with the endpoint devices), identification (e.g., user name/identifier, MAC address, or device identifier, associated with the user and/or endpoint devices), for example. In some embodiments, the network gateway may determine whether the end point devices are authorized based on the provided credentials to communicate with each other, and/or authorized to access one or more power domains of the power bus network 12. For example, if an unauthorized sensor 18 is connected to an RDC 16, and thereby the network pathway 13.

The plurality of switches 14 operate as an intermediary device for the network pathway 13 and extend the power bus network 12 to another endpoint device by way of the RDC 16. The switch 14 is operably connected to the avionics power bus network 12 and receives power from the bus network 12. The switch 14 allows for remote power distribution to other systems (e.g., RDC 16 and sensors 18) without having them be directly connected to the aircraft power in the power bus network 12. Additionally, the switch 14 is in communication with the network pathway 13 allowing the switch 14 to receive a data packet from the RDC 16 and transmit the data packet along the network pathway 13 to the second endpoint. A single switch 14 may be host to one or more RDCs 16, with each RDC-switch connection comprising a single cable 20. Beneficially, multiple RDCs 16 attached to a single switch 14 minimizes the number of switch 14 ports connecting the RDC 16 to the avionics system 10. Expanding upon the single cable 20, the single cable 20 may be a single quadrax cable connection for both power and ARINC 664 connectivity with the host switch allowing each device connected to the cable to consume a wattage continuously while maintaining a level of connectivity. In some embodiments, the single cable 20 allows a downstream device to consume wattage between 10 watts to 60 watts, continuously. For example, the single cable 20 has a power rating between 10 W and 40 W, 20 W and 60 W, 30 W and 40 W, or similar ranges. In some embodiments, the single cable 20 provides connectivity to the network pathway 13 of speeds between 10 and 1000 megabits per second (Mbps) continuously. In some embodiments, the single cable 20 conforms to the IEEE 802.3 Type 2 specification that allows each device power per cable to consume 25.5 watts continuously while maintaining 100 Mbps connectivity.

A network router or similar network interface maybe included on each switch 14, some switches 14, or all switches 14 in the avionics system 10. The network router is configured to properly distribute data packets received from the plurality of RDCs 16 to the other switches 14 and/or the correct second endpoint system. For example, a switch 14 is configured to allow data to be routed to other switches 14, devices, or users connected to the network pathway 13. The network router may provide a network translation layer over the network pathway 13, for example, may translate between one or more of: different voltages, current levels, communications protocols and/or frequencies, packet sizes, data rates, packet priority levels, network stack layers for packet processing and/or transmission, and other attributes of information passing through the router. In some embodiments, the switch is configured to convert the received data packet into a digital format, condition the signal, or perform any required filtering and data conversion computation to provide the data to the second endpoint of the avionics system 10. A switch 14 is described in greater detail below with respect to FIG. 3.

Each switch is operably connected to an RDC 16 by a single cable 20 that provides "power of Ethernet." The term "power of Ethernet" refers to the simultaneous transmission of Ethernet over the power transfer in the single cable 20, in other words, where a network device receives power through its data connection. Generally, each RDC includes a side with a single pin, with a data bus and power bus, for interfacing with a switch 14 and a data acquisition side structured to interface with the first endpoint system (e.g., sensors 18). Beneficially, the use of an RDC 16 with a single cable 20 connection to the switch reduces wiring, and therefore weight, while connecting the plurality of sensors 18 to the avionics system 10. Additionally, the RDC 16 can provide power to an undesirable location without directly including a wire of the backbone power bus network 12 to be physically near the undesirable location(s). The RDC 16 may be compact in size and/or power consumption allow the installation of the data concentrator close to the signal source, thereby simplifying installation, improving signal accuracy, and reducing overall weight of the system.

The RDC 16 is configured to include two full-duplex Ethernet connections such that an RDC 16 can transmit and receive messages on either an "A" network, a "B" network, or both networks, in some embodiments. Messages sent on both networks, such as an original message and a redundant copy of the original message, are typically selected at the destination end system using "First Arrival Wins," and the redundant copy may be discarded. In some embodiments, the RDC 16 may receive the data packet from the connected sensor 18 and pass the data packet (e.g., signal) to a second endpoint over the network pathway 13. In other embodiments, the RDC 16 may be configured to convert the received data packet into a digital format, condition the signal, or perform any required filtering and data conversion computation to provide the data to the second endpoint of the avionics system 10. The structure of the RDC is described in greater detail below, in regard to FIG. 4.

Each of the plurality of sensors 18 is connected to a respective RDC 16 and is configured to monitor and transmit data packets related to the aircraft 8 feature being monitored. For example, a sensor 18 may include an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, or a vision system (e.g., camera, infrared image sensor, LIDAR). As described herein, the sensor is an "input device" located adjacent an output device. For example, a temperature sensor (input device) may be located adjacent a valve (output device) whose position is dependent on a system temperature. In some embodiments, a single cable 20, similar to the single cable used to connect the RDC 16 and switch 14, is used to connect the RDC 16 to the sensor 18. In some embodiments, the plurality of sensors 18 (e.g., line-replaceable unit (LRU)) can include two full-duplex Ethernet connections such that a sensor 18 can transmit and receive messages on either an "A" network, a "B" network, or both networks.

As will be appreciated, a wide variety of configurations for the avionics system 10 using RDCs 16 with a connection 20 to a switch 14 are possible. For example, as seen in the front of the aircraft 8, a single RDC 16 is connected to a single switch 14, with no sensor 18 attached to the RDC 16. With this arrangement, the RDC 16 is the endpoint system and ready to receive a sensor 18. Turning to the right wing 3, two sensors 18 are connected to a single RDC 16, which in turn is connected to a single switch 14. The left wing 4 includes a single switch 14, connected to a single RDC 16, connected to a single sensor 18. At the tail of the aircraft 8, a single switch 14 is connected to two RDCs 16, which are each connected to a single sensor 18. As will be appreciated, the switch 14 located at the tail has a single cable connection 20 to the first RDC 16 and a separate, single cable connection 20 to the second RDC 16. The preceding configurations are merely exemplary, as various configurations of the plurality of switches 14 connected with a single cable connection 20 to the plurality of RDCs 16 are possible, for example, having multiple switches 14 between the power bus network 12 and an RDC 16.

Figure 2:
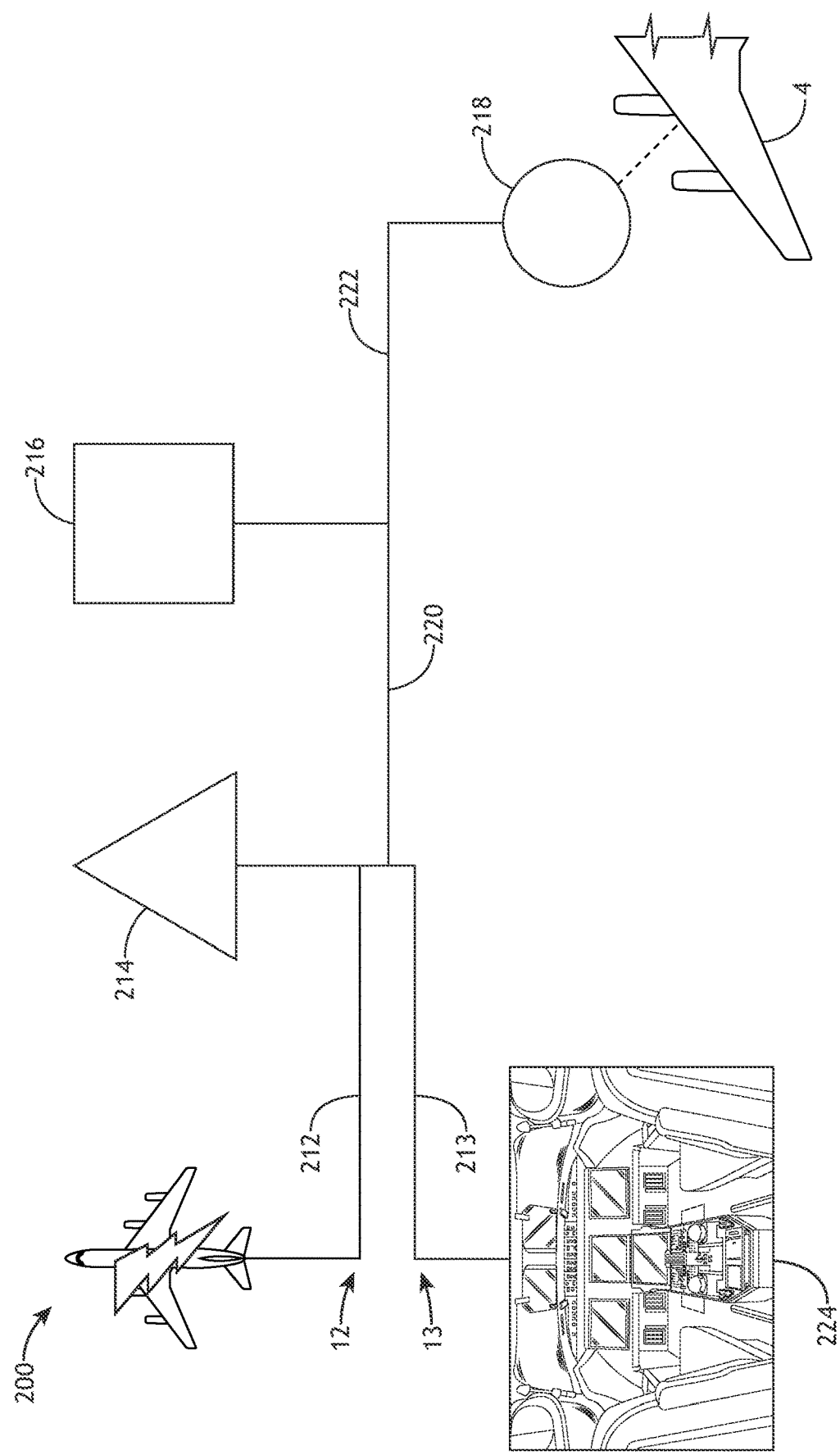
FIG. 2 is a block diagram of an exemplary embodiment of a system using remotely powered data concentrators for a distributed IMA system according to the inventive concepts disclosed herein.

Referring now to FIG. 2, a block diagram of an avionics system 200 using an RDC 216 is shown, according to an exemplary embodiment of the inventive concepts disclosed herein. As will be appreciated, the avionics system 200 can be the avionics system 10 of FIG. 1. The avionics system 200 includes an aircraft power bus network 12, a network pathway 13, a switch 214, an RDC 216, a first endpoint system 218, and a second endpoint system 224.

The aircraft power bus network 12 is centrally located in some embodiments, and provides power, either directly or indirectly, to the electronic systems of the avionics system 200. Following the flow of power to the avionics system 200, the power bus network 12 is connected to the switch 214 through a wired power connection 220. The power bus network 12 provides direct current ("DC") or alternating current ("AC") to the switch 214 from the main aircraft power through a first connection 212 (e.g., at least one wire). The switch 14 receives the current from the power bus network 12 and transmits it over the single cable connection 220 to the RDC 216. If AC power was provided to the switch 214, the switch 214 can convert the AC power to DC power before transmitting it to the RDC 216. The RDC 216 receives the DC power over the single cable connection 220 to a power hub located in the RDC 216. The single cable connection 220 may conform to the IEEE 802.3 Type 2 specification, thereby allowing the RDC 16 to consume 20-30 watts continuously, while maintaining a full 100 Mbps connection to the network pathway 13. As will be appreciated, the RDC 216 is not directly connected to the power bus network 12, instead, the power flows through—and can be altered by—the switch 214. If necessary, the RDC 216 provides power to the first endpoint system 218 (e.g., a sensor) to monitor a component or aspect of the aircraft 8.

Turning to the electronics communications of the avionics system 200, the network pathway 13 (e.g., aircraft electronic communication network) is configured to transmit data packets from a first endpoint system 218 or device to another endpoint system 224 or device, through one or more intermediary systems (e.g., switches 214 or RDCs 216). The first endpoint system 218 monitors a component or aspect of the aircraft 8. For example, the first endpoint system 218 monitors the angle of the aircraft wing. The first endpoint system 218 generates a data packet related to the monitoring and transmits it to the RDC 216. The RDC 216 receives the data packet from the first endpoint system 218 and may directly pass the data packet through the network pathway 13 or may alter the data (e.g., convert from analog to digital) the received data packet.

The RDC 216 transmits the data packet from a data bus to the switch 14 over the single cable connection 220. The single cable connection 220 conforms to the IEEE 802.3 Type 2 specification, in some embodiments, which can allow the RDC 216 to maintain a desired data flow rate (e.g., a full 100 Mbps connection) to the network pathway 13 while consuming 20-30 watts continuously. The data packet is received by the switch 214 along the network pathway 13. As shown in the FIG. 2, the switch 214 can have a first connection 212 for the aircraft power bus network 12 and a separate, second connection 213 for the network pathway 13. The switch 214 transmits the data packet to the second endpoint system 224 through the second connection 213 over the network pathway 13. In some embodiments, the switch 214 is configured to convert the received data packet into a digital format, condition the signal, route the data packet (e.g., to other switches or RDCs in the network), or perform any required filtering and data conversion computation to provide the data packet to the second endpoint system 224 (e.g., pilot's interface). As will be appreciated, the network pathway 13 can facilitate a data packet (e.g., a command) from the second endpoint system 224 to the first endpoint system 218, or any system (e.g., switch 214 or RDC 216) along the pathway.

Figure 3:
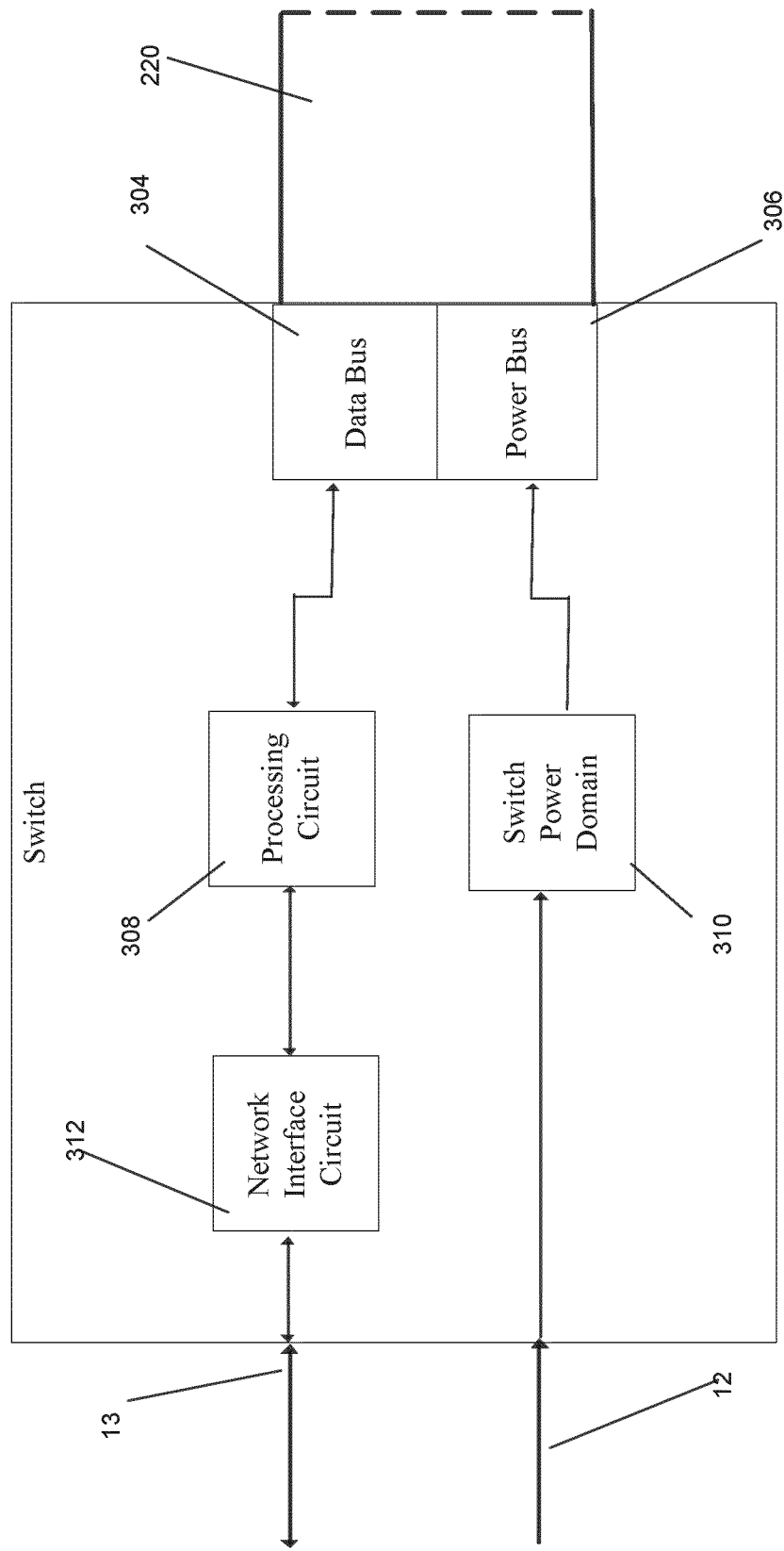
FIG. 3 is a schematic diagram of an exemplary embodiment of the switch of FIG. 2 according to the inventive concepts disclosed herein.

FIG. 3 is a schematic diagram of an exemplary embodiment of the switch 214 of FIG. 2 according to the inventive concepts disclosed herein. The switch 214 is operably connected to the network pathway 13 and the power bus network 12. The switch 214 includes a network interface device 312, a processing circuit 308, a power domain 310, a data bus 304, and a power bus 306. The switch 214 is connected to an RDC (not shown) through a single cable 220 that provides power over Ethernet.

Focusing on the flow of power through the switch 214, the power bus network 12 is upstream of the switch 214 and provides power directly from the aircraft power. The power flows through the switch to the power domain 310. The power domain 310 is configured to power the switch 214 and pass the current through to the power bus 306. In some embodiments, the power domain 310 converts the electric energy from one form to another (e.g., converting between AC and DC), changes the voltage or frequency of the electrical energy, incorporates redundancy, provides voltage regulation, or some combination of these. As will be appreciated, regardless of the form of the received electrical energy, the switch 214 will pass DC power through the single cable 220. Once received at the power bus 306, the power is provided over the single cable 220 simultaneously with the connectivity to the network pathway 13 (e.g., Ethernet). As is readily apparent in the embodiment of FIG. 3, the switch 214 does not provide power for the power bus network 12 to consume; in other words, it is a one-way flow through the switch 214 to downstream components.

Conversely, the network pathway 13 is a two-way flow, as the switch 214 transmits and receives data packets to and from the RDC. The network pathway 13 is configured to transmit data packets from one endpoint system or device to another endpoint system or device, through the switch 214. The processing circuit 308 is configured to execute processes related to the receipt and transmission of data packets. The processing circuit 308 may convert the received data packet into a digital format, condition the signal, or perform any required filtering and data conversion computation to provide the data to the second endpoint along the network pathway 13. For example, configuring the data packet to an Ethernet-based protocol or modifying the network pathway 13. The processing circuit 308 can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

The network interface circuit 312 is configured to receive incoming data packets, from either the RDC or other systems, and route the data packets to the appropriate destination electronic devices in accordance with the network configuration and the type of data packet. In some embodiments, the processing circuit 308 determines the appropriate network pathway 13 according to the data packet and passes the instructions for the network interface circuit 213 to carry out. Further, the network interface circuit 312 can provide authentication services to validate credentials provided by an endpoint system or connected RDC and determine whether to deny or grant access to the network pathway 13. The credentials and information may include any type or form of login information, certificate, encryption key information, biometrics, password/passcode, captcha response, addresses (e.g., device IP addresses associated with the endpoint devices), identification (e.g., user name/identifier, MAC address, or device identifier, associated with the user and/or endpoint devices), for example. The data bus 304 in configured to interface with the single cable connection 220. The network connectivity to the network pathway 13 is provided over the single cable 220 simultaneously with the power from the power bus 306.

Figure 4:
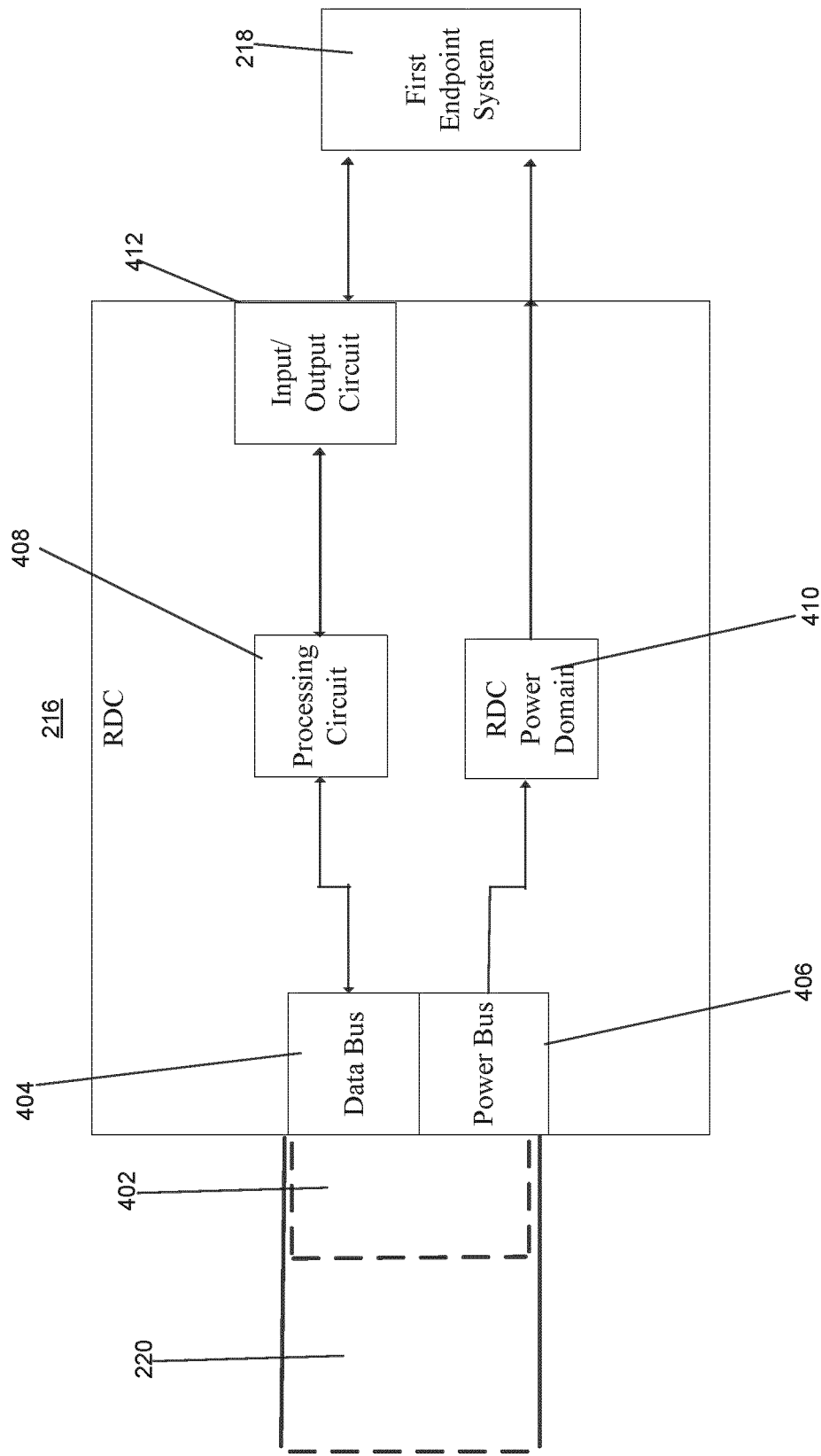
FIG. 4 is a schematic diagram of an exemplary embodiment of the remote data concentrator of FIG. 2 according to the inventive concepts disclosed herein.

FIG. 4 is a schematic diagram of an exemplary embodiment of the RDC 216 of FIG. 2 according to the inventive concepts disclosed herein. In some embodiments, the RDC 216 includes a single pin 402 with a data bus 404 and power bus 406 for interface with the single cable 220 providing power and access to the network pathway 13 by way of the switch (not shown). Additionally, the RDC 216 includes a processing circuit 208, a power domain 410 and an input/output circuit 412. The power bus 406 passes the power from the single cable 220 and passes it through to the power domain 410. The power domain 410 is configured to power the RDC 216 and pass the current through to the first endpoint system 218 if necessary. As is readily apparent, the RDC 216 does not pass power back to the switch for the switch to utilize, in other words, the power flows one-way through the RDC 216.

The switch-side interface of the RDC 216 includes a single interface for engagement with the single cable 220. The interface may include a number of pins less than a required number of pins for a connection between the data concentrator and the switch comprising a first wire for communication over the network pathway and a second wire for providing power. As such, the interface may include a single pin 402 that operably engages the single cable 220 to receive power and network connectivity simulations. The single cable 220 can conform to the IEEE 802.3 Type 2 specification that allows the RDC 216 to consume 25.5 watts continuously while maintaining 100 megabits per second (Mbps) connectivity. Beneficially, having Ethernet and power pass through a single cable can reduce the amount of power cables needed and, therefore, overall cable weight in the aircraft, and may similarly allow for RDCs 216 to be placed more closely to endpoint systems.

Turning to the network connectivity through the RDC 216, the data bus 404 passes the Ethernet from the single cable 220 to the RDC 216. The processing circuit 408 ensures that the data passed through the RDC 216 is in accordance to the Ethernet protocol. In some embodiments, the RDC 216 may receive the data packet from the connected first endpoint system 218 and pass the data packet to a second endpoint system over the network pathway 13. In other embodiments, the processing circuit 408 may be configured to convert the received data packet into a digital format, condition the signal, or perform any required filtering and data conversion computation to provide the data to the second endpoint system. The processing circuit 408 is configured to execute processes related to the receipt and transmission of data packets. The processing circuit 408 may convert the received data packet into a digital format, condition the signal, or perform any required filtering and data conversion computation to provide the data to the second endpoint along the network pathway 13. For example, the first endpoint system 218 may provide a raw data packet to the RDC 216, the processing circuit 408 may be converted to conform to an Ethernet-based protocol. Additionally, the processing circuit 408 may include an IEEE 802.3 signal conditioning module and an ARINC 664 (e.g., standard or protocol related to Ethernet connection) signal conditioning module.

In some embodiments, the RDC 216 is positioned closer to the first endpoint system 218 than would be possible with existing systems. For example, the first endpoint system 218 may be at least one of (1) located at a distance from the power bus network 12 (or a connection extending therefrom) which is greater than a power threshold distance or (2) located at a distance from the first endpoint system 218 which is less than an endpoint threshold distance. The power threshold distance may correspond to a design constraint for routing power cables through a platform such as the aircraft 8, where it is undesirable to route power too far from the power bus network 12. The endpoint threshold distance may correspond to a distance for routing multiple power cables too close to the first endpoint system 218, including but not limited to instances where the first endpoint system 218 is an engine sensor, and it is undesirable to provide too many power cables to the vicinity of the engine. The endpoint threshold distance may additionally or alternatively correspond to a distance at which the effectiveness of the RDC 216 is greater than a threshold effectiveness (e.g., effectiveness in concentrating data from the first endpoint system 218, and possibly other endpoint systems connected to the RDC 216). By implementing the RDC 216 in accordance with the inventive concepts disclosed herein, including providing power to the RDC 216 using the Ethernet connection from the switch 214, the RDC 216 can be positioned closer to the first endpoint system 218 and/or farther from the power bus network 12 than possible for existing systems.

The processing circuit 408 can include two full-duplex Ethernet connections such that an RDC 216 can transmit and receive messages on either an "A" network, a "B" network, or both networks. Messages sent on both networks, such as an original message and a redundant copy of the original message, are typically selected at the destination end system using "First Arrival Wins," and the redundant copy may be discarded. The processing circuit 408 can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

The data acquisition from the first endpoint system 218 passes through the input/output circuit 412. The data packet received from the endpoint system 218 is in accordance with the Ethernet protocol. Additionally, data packets (e.g., commands) from a second endpoint system to the first endpoint system 218 or the device monitored by the first endpoint system 218 can pass through the input/output circuit 412. The input/output circuit 412 may receive various avionics network inputs that include, but are not limited to, an ARINC 664 Rx input, an analog/discrete input, a monopole/tach input, analog/discrete wraps, and A664 wraps. The A664, or ARINC 664, refers to a standard or protocol related to serial bus connection. The term "wrap" is referred to herein as a feedback loop that may be used for self-governance or self-monitoring. A multiplexer and analog-to-digital converter may also couple with the input/output circuit 412 and receive inputs such as a current input, a voltage input, a resistive input, and analog wraps.

By way of example, the first endpoint system 218 is a valve sensor disposed adjacent a valve and transmits a first data packet to the RDC through the input/output circuit 412 according to the Ethernet protocol. The RDC 216 adjusts the first data packet, in accordance with the Ethernet protocol, and any path information by way of the processing circuit 408 and passes it through the data bus 404 to be transferred over the single cable 220 as "power of Ethernet". Subsequently, the RDC 216 receives a second data packet from a second endpoint system, for example, a control hub, responsive to the first data packet. The second data packet may include a command to adjust the valve being monitored by the sensor and/or the valve sensor itself. Accordingly, the processing circuit 408 determines the path of the second data packet, if a conversion of the second data packet is necessary, and transmits it through the input/output circuit 412 to the proper device.

Figure 5:
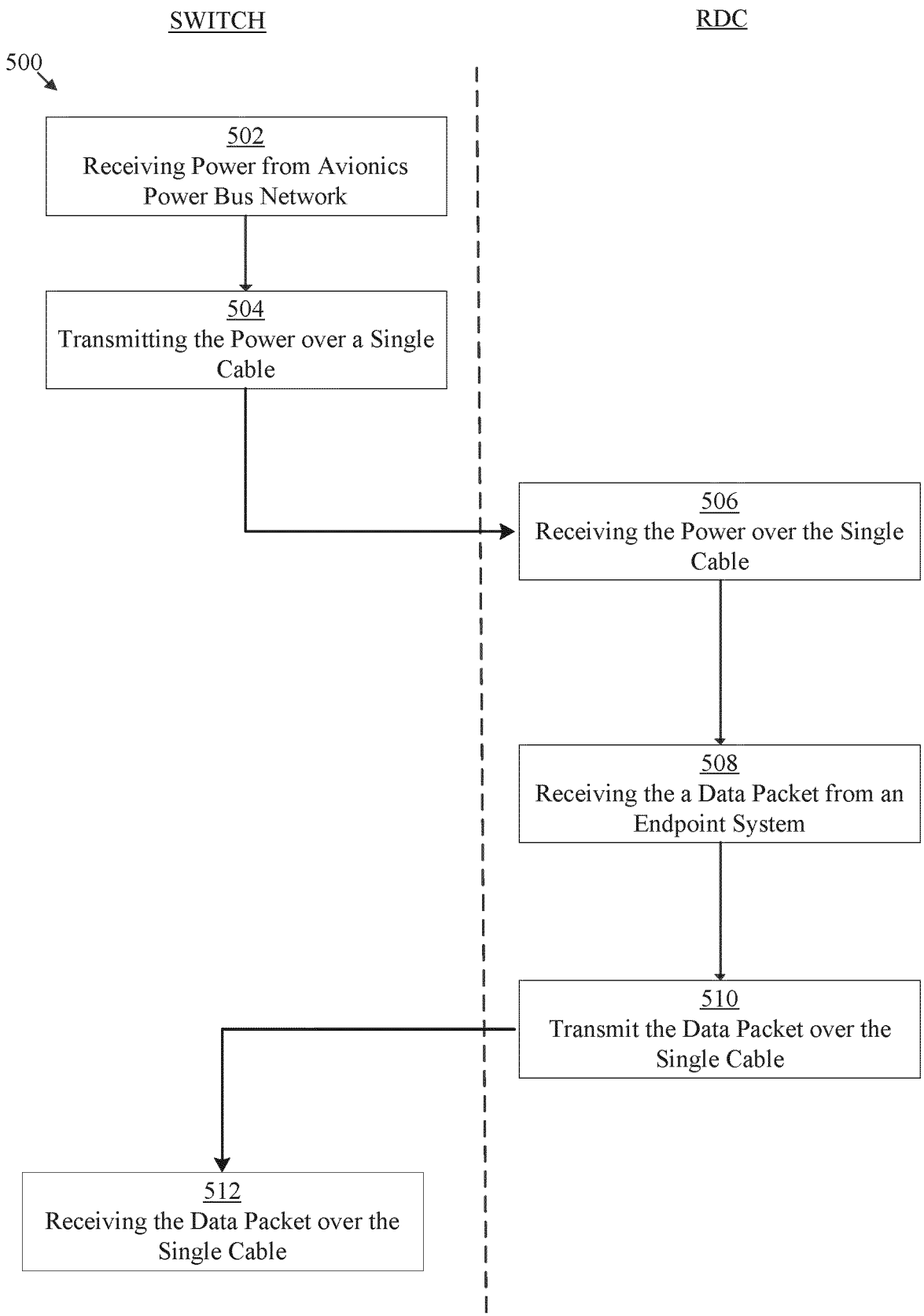
FIG. 5 is a diagram of an exemplary embodiment of a method for a system using remotely powered data concentrators for a distributed IMA system according to the inventive concepts disclosed herein.

FIG. 5 is a diagram of an exemplary embodiment of a method 500 according to the inventive concepts disclosed herein. The method 500 may be executed using various hardware, apparatuses, and systems disclosed herein, such as the systems 10, 200, the various configurations of the switch 214, the various configurations of the RDC 216, and/or components or features thereof.

A step (502) may include receiving, at a switch, power from an avionics power bus network. The power bus network is used to provide primary power to different systems on the aircraft including the switch. The power bus network transmits the power over a wired connection to the switch. In some embodiments, the switch may include a power conversion (e.g., redundancy, voltage regulation, frequency change, or converter) circuit to adjust the power for consumption by downstream components. This may be done to reduce risk of supplying power to undesirable downstream environments.

A step (504) may include transmitting the power, over a single cable, to an RDC. The single cable is structured to provide power over network connectivity (e.g., Ethernet). For example, the single cable may be a single quadrax cable connection for both power and ARINC 664 connectivity with the "host" switch. The single cable conforms to the IEEE 802.3 Type 2 specification that allows each device power per cable to consume 25.5 watts continuously while maintaining 100 megabits per second (Mbps) connectivity. Beneficially, having Ethernet and power pass through a single cable reduces the amount of cables needed and, therefore, overall cable weight in the aircraft.

A step (506) may include receiving, at the RDC, the power over the single cable connection with the switch. The power is received on a single pin of the RDC that is structured to receive and parse the power over Ethernet from the single cable. In some embodiments, the RDC provides the power downstream to an endpoint system/sensor. In other embodiments, the sensors are passive sensors that do not require an external source (e.g., from the RDC) of power.

A step (508) may include receiving, at the RDC, a data packet from the endpoint system. The endpoint system is configured to monitor and transmit data packets related to the aircraft feature being monitored. For example, the end point system may include an inertial measurement unit, an air data sensor, a magnetic compass, or a vision system. The endpoint system is an "input device" located adjacent an output device (e.g., device or aspect being measured). In some embodiments, a single cable, similar to the single cable used to connect the RDC and switch, is used to connect and transfer the data packet between the RDC to the endpoint system.

A step (510) may include transmitting the data packet, over the single cable, to the switch. Converse to the flow from the switch to the RDC, the RDC does not provide power over the single cable for consumption by the switch. The single cable conforms to the IEEE 802.3 Type 2 specification that allows each device power per cable to consume 25.5 watts continuously while maintaining 100 megabits per second (Mbps) connectivity. Beneficially, having Ethernet and power pass through a single cable reduces the amount of cables needed and, therefore, overall cable weight in the aircraft.

A step (512) may include receiving, at the switch, the data packet over the single cable. Once received, the switch may route the data packet to another RDC, switch, and/or second endpoint system over the network pathway. Additionally, the switch may modify the network pathway to connect the data packet from the endpoint system to a second endpoint system. The data packets may be communicated according to an Ethernet-based protocol, such as the ARINC-664 protocol (e.g., AFDX Ethernet protocol).

The present disclosure contemplates methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   an avionics power bus network for providing power to at least a first endpoint system and a second endpoint system coupled via at least one network pathway, the network pathway configured for transmitting a data packet between the first endpoint system and the second endpoint system;
   a switch operably connected to the avionics power bus network, the switch configured to receive the data packet from the first endpoint system and transmit the data packet along the network pathway to the second endpoint system, the switch configured to receive power from the avionics power bus network; and
   a data concentrator operably connected the first endpoint system to receive the data packet from the first endpoint system, the data concentrator operably connected to the switch through a wire, the wire configured to transmit the power received by the switch from the avionics power bus network from the switch to the data concentrator and configured to transmit the data packet from the data concentrator to the switch, wherein the data concentrator is connected to the first endpoint system via one or more first wires configured to receive the data packet and powers the first endpoint system based on the power by transmitting the power to the first endpoint system via one or more second wires.

2. The system of claim 1, wherein the data concentrator comprises a first Ethernet-based communications interface configured to transmit the data packet to a second Ethernet-based communications interface in the switch.

3. The system of claim 1, wherein the first endpoint system is a sensor, the sensor comprising a processing circuit configured for transmitting the data packet to the data concentrator.

4. The system of claim 1, wherein the first endpoint system is at least one of an engine temperature sensor, an air pressure sensor, a tail sensor, a wheel sensor, an accelerometer, a gyroscope, or a vision sensor.

5. The system of claim 1, wherein the data concentrator comprises a single pin, the single pin configured to operably connect with the wire and receive power from the switch and transmit the data packet to the switch over the wire.

6. The system of claim 1, wherein the data concentrator comprises an interface configured to connect to the wire, wherein the interface includes a number of pins less than a required number of pins for a connection between the data concentrator and the switch comprising a first wire for communication over the network pathway and a second wire for providing power.

7. The system of claim 1, wherein the wire is a single quadrax cable connection.

8. The system of claim 1, wherein the data packet is a first data packet, further comprising: a third endpoint system operably connected to the data concentrator, the third endpoint system configured to communicate a second data packet, wherein the wire is configured to communicate the first data packet and second data packet over the network pathway.

9. The system of claim 1, wherein the data concentrator comprises a data bus and a power bus in a single pin, the single pin configured to operably connect with the wire.

10. The system of claim 1, wherein the data concentrator is a first data concentrator, the wire is a first wire, and the data packet is a first data packet, the system further comprising:
    a second data concentrator operably connected to a third endpoint system to receive a second data packet, and operably connected to the switch through a second wire, the second wire configured to transmit power from the switch to the second data concentrator and configured to transmit the second data packet from the second data concentrator to the switch over the network pathway.

11. A method, comprising:
    receiving, at a switch, power from an avionics power bus network, the avionics power bus network for providing power to at least a first endpoint system and a second endpoint system;
    transmitting, from the switch, the power over a wire to a data concentrator coupled to the first endpoint system;
    receiving, at the switch, a data packet transmitted by the first endpoint system over the wire via the data concentrator, wherein the data concentrator is connected to the first endpoint system via one or more first wires configured to receive the data packet and powers the first endpoint system based on the power by transmitting the power to the first endpoint system via one or more second wires; and
    communicating the data packet from the switch to the second endpoint system using a network pathway, the network pathway providing communications between the first endpoint system and the second endpoint system through one or more of network access interfaces.

12. The method of claim 11, wherein transmitting power from the switch to the data concentrator over the wire and receiving the data packet at the switch from the first endpoint system over the wire via the data concentrator occur simultaneously over the same wire.

13. The method of claim 11, wherein receiving the data packet at the switch over the wire comprises using an interface configured to connect the switch to the wire, wherein the interface includes a number of pins less than a required number of pins for a connection between the interface and the switch comprising a first wire for communication over the network pathway and a second wire for providing power.

14. The method of claim 11, wherein the data packet is a first data packet, the method further comprising:

receiving a second data packet from a third endpoint system, wherein the wire is configured to communicate the first data packet and second data packet over the network pathway.

15. A data concentrator comprising:

a pin, the pin comprising a data bus and a power bus, the data bus configured to transmit a data packet over a network pathway connecting a first endpoint system and a second endpoint system, and the power bus configured to receive power;

a wire operably connected to the pin, the wire configured to transmit direct current to the data concentrator and configured to transmit the data packet from the data concentrator over the network pathway; and a processor configured to receive the data packet from the first endpoint system, wherein the network pathway is an avionics power bus network for providing power to at least the first endpoint system and the second endpoint system coupled via at least one network pathway, the network pathway configured for transmitting the data packet between the first endpoint system and the second endpoint system, wherein a switch is operably connected to the avionics power bus network, the switch being configured to receive the data packet from the first endpoint system and transmit the data packet along the network pathway to the second endpoint system, the switch configured to receive the power from the avionics power bus network to provide the power through the data concentrator to the first endpoint system, and wherein the data concentrator is operably connected the first endpoint system to receive the data packet from the first endpoint system, the data concentrator operably connected to the switch through the pin, the pin being configured to receive the power from the switch and configured to transmit the data packet from the data concentrator to the switch;

wherein the data concentrator is connected to the first endpoint system via one or more first wires configured to receive the data packet and the data concentrator is configured to power the first endpoint based on the power by transmitting the power to the first endpoint system via one or more second wires.

16. The data concentrator of claim 15, wherein the first endpoint system is at least one of an engine temperature sensor, an air pressure sensor, a tail sensor, a wheel sensor, accelerometer, gyroscope, or a vision sensor.

17. The data concentrator of claim 15, wherein the wire is a single quadrax cable connection.

18. The data concentrator of claim 15, wherein the data packet is a first data packet, further comprising:

a third endpoint system operably connected to the data concentrator, the third endpoint system configured to communicate a second data packet, wherein the wire coupled to the pin is configured to communicate the first data packet and second data packet over the network pathway.

19. The data concentrator of claim 15, wherein the data concentrator is further configured to receive direct current power from the switch operably connected to the network pathway and to a power bus domain, the switch configured to receive the data packet and transmit the data packet along the network pathway to the second endpoint system.

20. The data concentrator of claim 19, wherein the data concentrator comprises an interface, wherein the interface includes a number of pins less than a required number of pins for a connection between the data concentrator and the switch comprising a first wire for communication over the network pathway and a second wire for providing power.

* * * * *